US005471839A

United States Patent [19]

Hirata et al.

[11] Patent Number: 5,471,839

[45] Date of Patent: Dec. 5, 1995

[54] VALVE APPARATUS AND HYDRAULIC DRIVE SYSTEM

[75] Inventors: Toichi Hirata, Ushiku; Genroku Sugiyama, Ibaraki, both of Japan

[73] Assignee: Hitachi Construction Machinery Co., Ltd., Tokyo, Japan

[21] Appl. No.: 536,663

[22] PCT Filed: Mar. 23, 1990

[86] PCT No.: PCT/JP90/00391

§ 371 Date: Jul. 9, 1990

§ 102(e) Date: Jul. 9, 1990

[87] PCT Pub. No.: WO90/11464

PCT Pub. Date: Oct. 4, 1990

[30] Foreign Application Priority Data

Mar. 24, 1989 [JP] Japan .................................... 1-70396

[51] Int. Cl.[6] .................................................. F16D 31/02

[52] U.S. Cl. ......................................... 60/484; 137/596.13

[58] Field of Search ............................ 60/427, 452, 484; 137/596.13, 596.15

[56] References Cited

U.S. PATENT DOCUMENTS

| | | | |
|---|---|---|---|
| 2,403,519 | 9/1946 | Gardiner | 60/393 |
| 2,772,694 | 12/1956 | Simmons | 137/596.13 |
| 2,924,240 | 2/1960 | Dolan | 137/596.13 |
| 2,986,166 | 5/1961 | Hoen | 137/596.13 |
| 3,216,443 | 11/1965 | Schmiel | 137/596.13 X |
| 3,451,426 | 6/1969 | Flint | 137/596.13 |
| 3,565,110 | 2/1971 | Hodgson | 137/596.12 |
| 3,707,988 | 1/1973 | Hodgson | 137/596.12 |
| 3,720,059 | 3/1973 | Schurawski et al. | 60/427 X |
| 3,866,418 | 2/1975 | Waters | 60/427 X |
| 4,095,617 | 6/1978 | Hodgson | 137/596.13 |
| 4,256,142 | 3/1981 | Hancock | 137/596.13 X |
| 4,290,449 | 9/1981 | Budzich | 137/596.13 |
| 4,352,375 | 10/1982 | Williams | 137/596.13 |
| 4,617,854 | 10/1986 | Kropp | 91/517 |
| 4,738,279 | 4/1988 | Kropp | 60/452 X |
| 5,040,565 | 8/1991 | Karakama et al. | 137/596.15 |

FOREIGN PATENT DOCUMENTS

| | | | |
|---|---|---|---|
| 45-22471 | 7/1970 | Japan . | |
| 49-19282 | 2/1974 | Japan . | |
| 54-59575 | 5/1979 | Japan . | |
| 0054801 | 3/1984 | Japan | 60/452 |
| 60-11706 | 1/1985 | Japan . | |

*Primary Examiner*—Edward K. Look
*Assistant Examiner*—Hoang Nguyen
*Attorney, Agent, or Firm*—Fay, Sharpe, Beall, Fagan, Minnich & McKee

[57] ABSTRACT

A valve apparatus has a casing (11; 41) formed therein with at least one pair of spool bores (**12*a*, 13*c*, etc.; 42*a*, 43*a*), a single common pump port (19), at least one tank port (16*t*) and a plurality of actuator ports (22*a*, 23*a*, etc.) including a pair of actuator ports communicating with each of the spool bores, and a plurality of spools (14*a*, 15*a*, etc.; 44*a*, 45*a*) slidably inserted respectively in the spool bores in the casing. Each of the spools control communication between the common pump port and tank port and the corresponding pair of the actuator ports. The common pump port is arranged to communicate with a common pump line (18**) which is formed between the pair of spool bores and spools arranged in juxtaposed relation to each other so as to intersect a plane in which the axes of the pairs of spool bores extend.

6 Claims, 5 Drawing Sheets

VALVE APPARATUS AND HYDRAULIC DRIVE SYSTEM

TECHNICAL FIELD

The present invention relates to valve apparatuses for use in hydraulic drive systems and, more particularly, to a valve apparatus having a plurality of directional control valves of closed center type arranged collectively and a hydraulic drive system having incorporated therein the valve apparatus, which are suitable for use in a working machine such as a construction machine, an industrial machine or the like in which a plurality of working elements are hydraulically driven.

BACKGROUND ART

As a representative example of a working machine in which a plurality of working elements are hydraulically driven, there are construction machines such as a hydraulic excavator, a hydraulic crane and so on. Each of these construction machines is equipped with a hydraulic drive system which is provided with a plurality of actuators for driving the plurality of working elements. In the hydraulic drive system, driving of the plurality of actuators is controlled by a plurality of directional control valves for controlling flows of hydraulic fluid delivered from a hydraulic pump.

By the way, as the hydraulic drive system of this kind, there is a system called a load sensing system in which, as disclosed, for example, in JP,A,60-11706, a pump delivery flow rate is controlled such that a differential pressure between a delivery pressure of the hydraulic pump and a maximum load pressure of a plurality of actuators (a load pressure of a corresponding actuator in the case of individual operation) is retained to a prescribed value, so that the flow rate required for driving the actuators is delivered from the hydraulic pump. In the load sensing system, it is preferable to use a directional control valve of closed center type in which the spool closes the respective ports at a neutral position to prevent flow of the hydraulic fluid. Thus, unnecessary discharge of hydraulic fluid at the time each directional control valve is in the neutral position is minimized so that unloading operation of the hydraulic pump is made possible in combination with an unloading valve.

On the other hand, the plurality of directional control valves used in the hydraulic drive system are, in practice, formed as a valve apparatus in which the directional control valves are arranged collectively. The conventional valve apparatus having the directional control valves of closed center type are known from, for example, see JP,A,49-19282 and JP,A,54-59575. The conventional valve apparatus comprises a casing formed therein with a plurality of parallel spool bores arranged in a single row, a single common pump port, at least one tank port and a plurality of actuator ports with each pair associated with a single spool bore, and a plurality of spools slidably inserted respectively in the spool bores in the casing. The spools form respectively a plurality of directional control valves of closed center type, and each spool controls communication between the common pump port and tank port and the corresponding pair of the actuator ports. The common pump port communicates with a common pump line which extends perpendicularly to the plurality of parallel spool bores arranged in the single row, and successively passes through the spool bores.

However, the above-described conventional valve apparatus has the following problems.

The conventional valve apparatus is arranged such that the common pump line extends perpendicularly to the plurality of parallel spool bores arranged in the single row, and successively passes through the spool bores. For this reason, when the hydraulic fluid flows into the spools in the bores through the pump line, the hydraulic fluid surely passes through narrow grooves around one or more spools located upstream of the spool remotest from the pump port. Accordingly, pressure losses are large and cause an energy loss. Further, since temperature is raised due to an increase In heat generation, the reliability of the valve apparatus is deteriorated.

Furthermore, since the pressure losses are caused due to a passing of the hydraulic fluid through the spools, the more the spools are positioned downstream, the more the pressure losses increase. For this reason, in the case where the valve apparatus is used in the load sensing system, since a differential pressure between the pump delivery pressure and the load pressure is retained at a prescribed value, differential pressures across the downstream spools having their respective large pressure losses are reduced so that, even if the spools are operated at their respective maximum openings, sufficient passing flow rate cannot correspondingly be obtained. Thus, the actuators cannot be driven at the maximum speed, so that operability is reduced. Further, since the pressure losses are not constant for all of the spools in the case where the plurality of actuators are driven simultaneously, a difference in the differential pressure across each spool occurs in accordance with a difference in the pressure losses. For this reason, the characteristic of the passing flow rate with respect to the operational amounts of the respective spools differs spool by spool, so that a problem occurs in the operability of the simultaneous driving of the plurality of actuators.

Moreover, in the case where the pair of spools of the valve apparatus control left- and right-hand traveling motors of a construction vehicle as directional control valves, the differential pressures are different from each other between the pair of spools as described above. Accordingly, the flow rates of the hydraulic fluid supplied respectively to the left- and right-hand traveling motors are different from each other so that the traveling direction is brought to such a condition as to be bent naturally. That is, it becomes difficult to secure linearity of the traveling.

It is an object of the invention to provide a valve apparatus having a plurality of directional control valves of closed center type arranged collectively and a hydraulic drive system provided with the valve apparatus, in which, a pressure loss between a pump port and each of a plurality of spools is relatively small.

It is another object of the invention to provide a valve apparatus having a plurality of directional control valves of closed center type arranged collectively and a hydraulic drive system provided with the valve apparatus, in which the pressure losses between a pump port and a plurality of spools are substantially the same for all of the spools to improve the operability.

It is still another object of the invention to provide a valve apparatus having a plurality of directional control valves of closed center type arranged collectively and a hydraulic drive system provided with the valve apparatus, in which it is possible to secure linearity of traveling when left- and right-hand motors are controlled.

DISCLOSURE OF THE INVENTION

For the above purposes, according to the invention, there is provided a valve apparatus comprising a casing formed therein with a plurality of spool bores, a single common pump port, at least one tank port and a plurality of actuator ports including a pair of actuator ports communicating with each of the spool bores, and a plurality of spools slidably inserted respectively In the spool bores in the casing, each of the spools controlling communication between the common pump port and tank port and the corresponding pair of the actuator ports to provide a directional control valve of closed center type, wherein the plurality of spool bores include at least one pair of spool bores arranged in juxtaposed relation to each other, the pair of spool bores having axes extending in a plane, and the plurality of spools include at least one pair of corresponding spools arranged in juxtaposed relation to each other, and the common pump port being arranged to communicate with a common pump line formed between the pair of spool bores and spools arranged in juxtaposed relation so as to intersect the plane in which the axes of the pair of spool bores are located.

Preferably, the common pump line extends in a direction perpendicular to the plane in which the axes of the pair of spool bores arranged in juxtaposed relation are located.

Further, preferably, the plurality of spool bores include a plurality of pairs of spool bores each pair arranged in juxtaposed relation to each other, the respective pairs of spool bores having axes extending respectively in planes arranged in juxtaposed parallel relation to each other, and the common pump line being formed between the pair of spool bores so as to intersect the planes arranged in juxtaposed relation.

Moreover, preferably, the pair of actuator ports communicating with each of the spool bores are positioned at a side of the pair of spools opposite to the side thereof where the pair of spools face toward each other.

Furthermore, preferably, the common pump line is formed to communicate with the pair of spool bores arranged in juxtaposed relation through respective branch lines.

Preferably, the set of pair of spools arranged in juxtaposed relation provide directional control valves for controlling a pair of traveling motor of a construction vehicle.

Further, for the above purposes, according to the invention, there is provided a hydraulic drive system comprising a hydraulic pump, a plurality of hydraulic actuators driven by hydraulic fluid delivered frown the hydraulic pump, a plurality of directional control valves of closed center type for respectively controlling flows of the hydraulic fluid supplied to the plurality of actuators from the hydraulic pump, and pressure compensating means for retaining a differential pressure between a delivery pressure of the hydraulic pump and a maximum load pressure of the actuators, at a prescribed value, wherein the plurality of directional control valves of closed center type are formed by the above-mentioned valve apparatus.

BEST MODE FOR CARRYING OUT THE INVENTION

Embodiments of the invention will be described below with reference to FIGS. 1 through 3.

Figure 1:
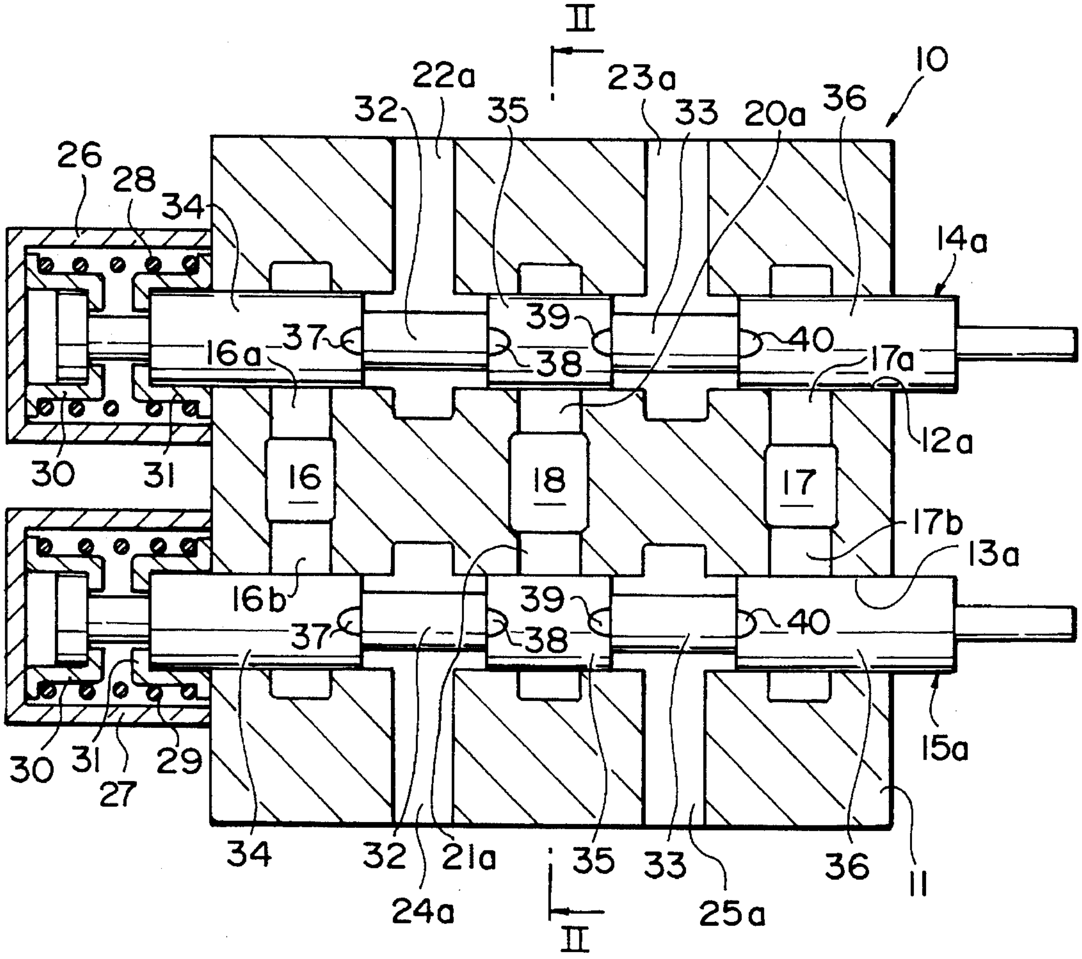
FIG. 1 is a cross-sectional view of a valve apparatus according to an embodiment of the invention.
Figure 2:
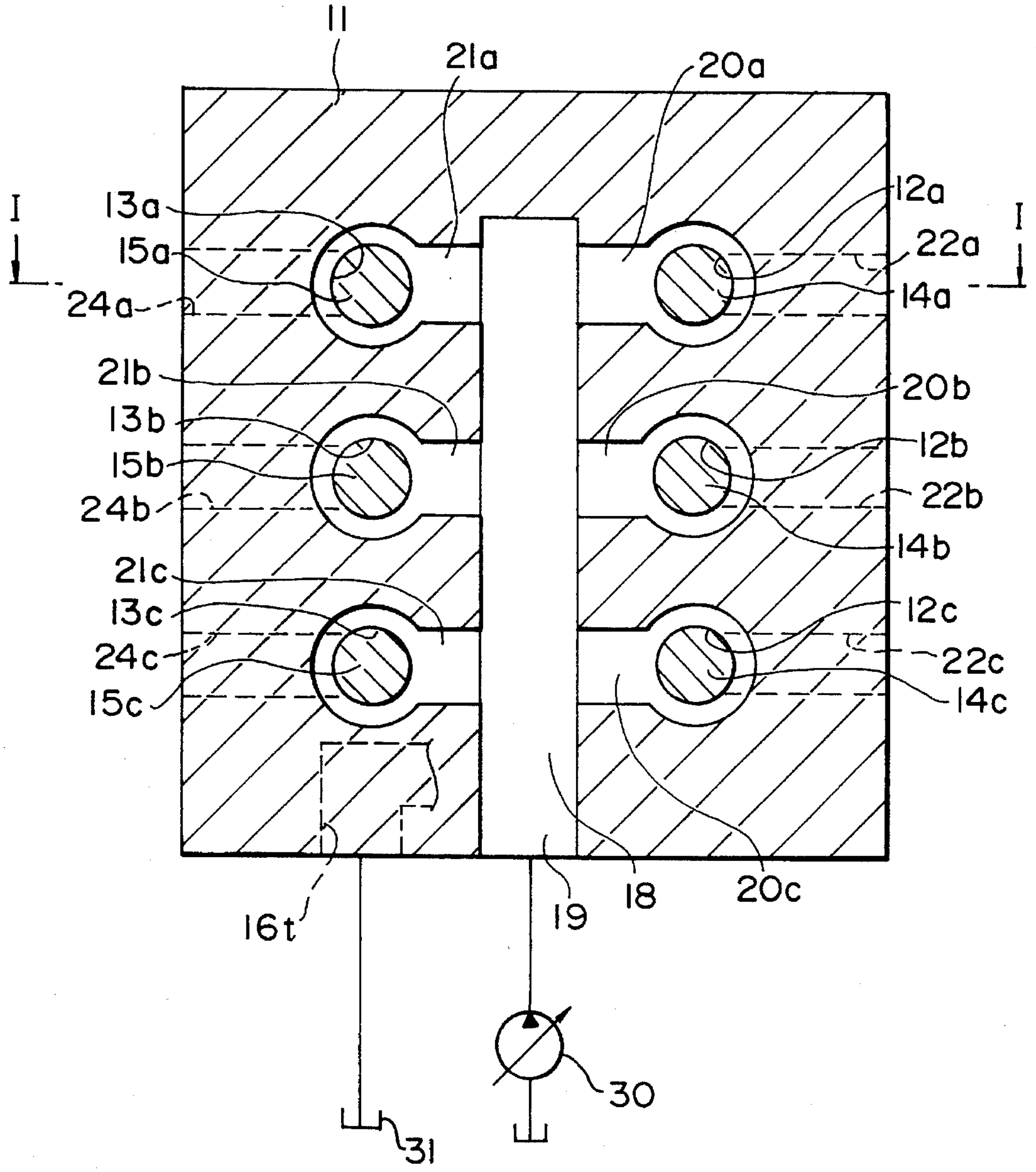
FIG. 2 is a cross-sectional view taken along the line II—II in FIG. 1 the line I—I in the figure representing the cross-sectional line in FIG. 1.

In FIGS. 1 and 2, the reference numeral 10 denotes a valve apparatus according to an embodiment of the invention. The valve apparatus 10 comprises a casing 11 in the form of a rectangular parallelepiped. The casing 11 is formed therein with three sets or pairs of spool bores each pair arranged in juxtaposed relation to each other, that is, a first set of spool bores **12*a* and 13*a*, a second set of spool bores 12*b* and 13*b*, and a third set of spool bores 12*c* and 13*c*. Inserted slidably in these spool bores are likewise three sets or pairs of spools each pair arranged in juxtaposed relation to each other, that is, a first set of spools 14*a* and 15*a*, a second set of spools 14*b* and 15*b* and a third set of spools 14*c* and 15*c*. These spool bores 12*a* and 13*a*; 12*b* and 13*b*; and 12*c* and 13*c* are arranged such that a pair of axes of the first set of spool bores 12*a* and 13*a*, a pair of axes of the second set of spool bores 12*b* and 13*b* and a pair of axes of the third set of spool bores 12*c* and 13*c*** are located respectively in three planes which are arranged in juxtaposed relation to each other.

The casing 11 is also formed therein with a pair of tank lines 16 and 17 which extend between the pairs of spool bores **12*a* and 13*a*; 12*b* and 13*b*; and 12*c* and 13*c* in each set adjacent opposed ends of the respective spool bores in a direction perpendicular to the above-mentioned three planes. These tank lines 16 and 17 are connected to a common tank port 16*t* which opens in a side surface of the casing 11 perpendicular to the tank lines 16 and 17. Further, the tank lines 16 and 17 communicate with the spool bores 12*a* and 13*a* through branch lines 16*a* and 16*b* and 17*a* and 17*b* and, likewise, communicate with the other sets of spool bores 12*b* and 13b and 12*c* and 13*c*** through branch lines (not shown).

Furthermore, the casing 11 is formed therein with a single common pump line 18 which extends between the pairs of spool bores **12*a* and 13*a*; 12*b* and 13*b*; and 12*c* and 13*c* in each set adjacent axially central sections of the respective spool bores in a direction perpendicular to the above-mentioned planes. The pump line 18 is connected to a pump port 19 which opens in the side surface of the casing 11 perpendicular to the pump line 18. The pump line 18 communicates with the spool bores 12*a* and 13*a*; 12*b* and 13*b*; and 12*c* and 13*c* through respective branch lines 20*a* and 21*a*; 20*b* and 21*b*; and 20*c* and 21*c***.

Moreover, the casing 11 is formed therein with two pairs of actuator ports **22*a* and 23*a* and 24*a* and 25*a* which extend in a direction perpendicular to the first set of spool bores 12*a* and 13*a* and communicate therewith. The actuator ports 22*a* and 23*a* are positioned at a side of the spools 14*a* and 15*a* inserted in the spool bores 12*a* and 13*a* opposite to the side thereof where the spools 14*a* and 15*a* face toward each other, and open in a side surface of the casing 11. Likewise, the actuator ports 24*a* and 25*a* are positioned at a side of the spools 14*a* and 15*a* opposite to the side where the spools 14*a* and 15*a* face toward each other, and open to a side surface of the casing 11. In a similar manner, four pairs of actuator ports 22*b*, 23*b*, 24*b* and 25*b*; and 22*c*, 23*c*, 24*c* and 25*c* (see FIG. 3 with reference to 23*b*, 25*b*, 23*c* and 25*c*) are formed also with respect to the other sets of spool bores 12*b* and 13*b*** and 12c and 13c, respectively.

A pair of covers 26 and 27 are fixedly mounted to the side surface of the casing 11 from which one end of the respective spools 14a and 15a project, for covering respectively the one ends of the respective spools. Within the covers 26 and 27, a pair of switching set springs 28 and 29 are mounted respectively on one end of the spools 14a and 15a through respective pairs of spring retainers 30 and 31, for holding or retaining neutral positions of the respective spools 14a and 15a. The other ends of the spools 14a and 15a are connected to operational handles (not shown). Further, each of the spools 14a and 15a is formed with a pair of smaller-diameter sections 32 and 33 and three lands 34, 35 and 36 which are divided by the smaller-diameter sections 32 and 33. Notches 37, 38, 39 and 40 each forming a variable restrictor are formed respectively at end portions of the lands 34, 35 and 36 adjacent the smaller-diameter sections 32 and 33. Although not shown, similar components or parts are provided on each of the other spools 14b and 15b and 14c and 15c, and similar configurations are given respectively to each of the other spools 14b and 15b and 14c and 15c.

In the valve apparatus 10 constructed as above according to the embodiment, hydraulic fluid flowing through the pump port 19 passes through the pump line 18 and the branch lines 20a~21c. and is introduced to the spools 14a~15c. At this time, the pump line 18 extends between the pairs of spool bores 12a and 13a; 12b and 13b; and 12c and 13c in the respective sets, and communicates with the spool bores 12a~13c through the branch lines 20a~21c. Accordingly, the hydraulic fluid does not pass through the spools, like the conventional apparatus. Thus, a pressure loss of the hydraulic fluid flow from the pump port 19 to each of the spools 14a~15c is extremely small. For this reason, an energy loss is small, and heat generation is reduced to the minimum, so that the reliability of the valve apparatus is improved. Further, a service life of various instruments is prolonged.

Moreover, distances from the pump line 18 to the respective spools 14a~15c, that is, lengths of the respective branch lines 20a~21c are all the same as each other. Accordingly, the pressure loss of the hydraulic fluid flow from the pump line 18 to the respective spools 14a~15c are substantially the same as each other. For this reason, in the case where the pair of spools of the valve apparatus 10 control left- and right-hand traveling motors for a construction vehicle as directional control valves, differential pressures across the pair of spools become substantially the same as each other. Thus, flow rates of the hydraulic fluid supplied respectively to the left and right-hand traveling motors become substantially the same as each other, so that linearity of the traveling can easily be secured. This will be described below in detail with reference to FIG. 3.

Figure 3:
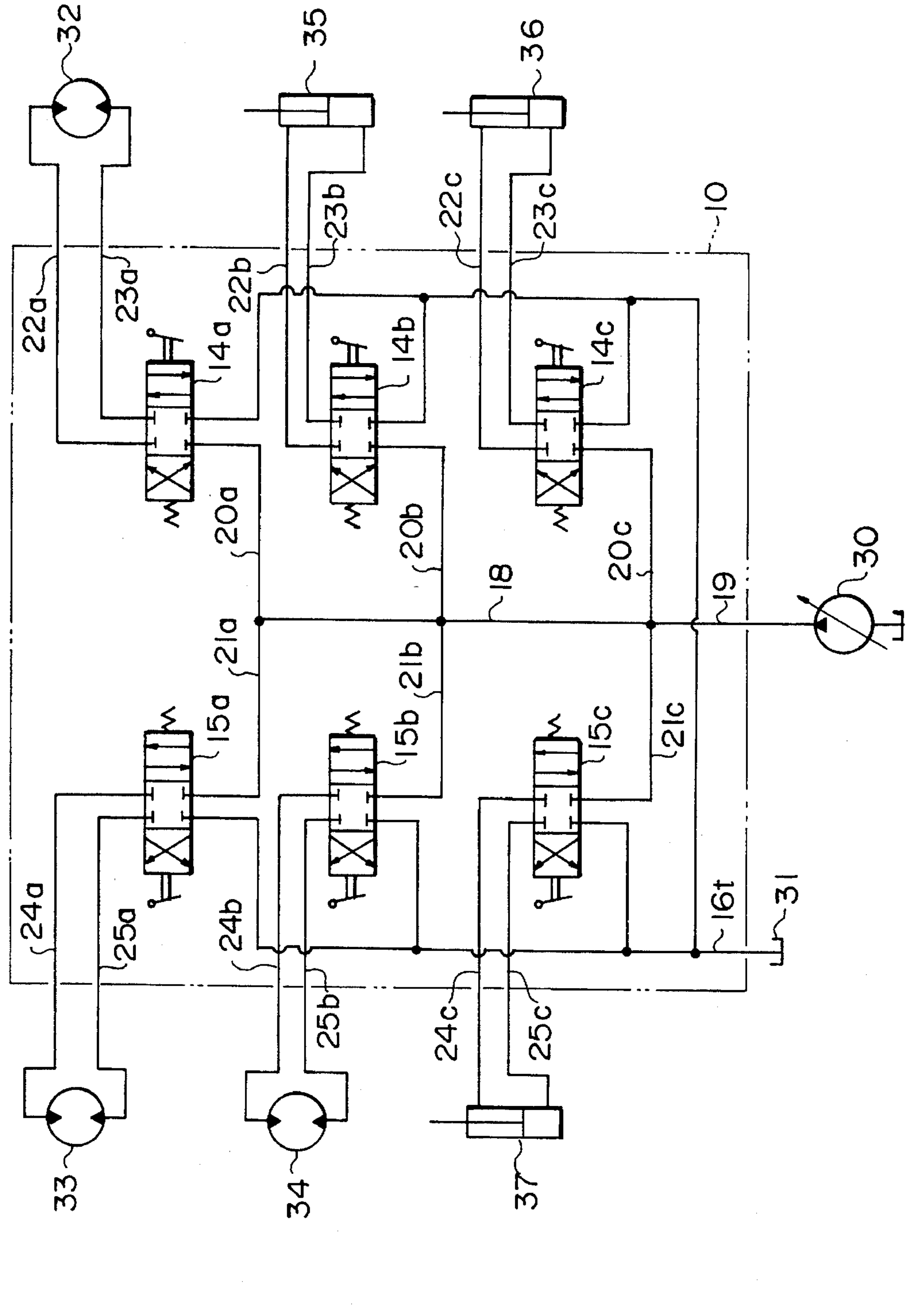
FIG. 3 is a circuit view showing an example of a hydraulic drive system which is formed by the use of the valve apparatus illustrated in FIG. 1.

FIG. 3 shows a circuit arrangement in which the valve apparatus 10 according to the embodiment is applied to a hydraulic drive system for a hydraulic excavator. A hydraulic pump 30 of variable displacement type is connected to the pump port 19 of the valve apparatus 10, and a tank 31 is connected to the tank port 16t. Further, left and right-hand traveling motors 32 and 33 are connected respectively to the actuator ports 22a and 23a and 24a and 25a which are associated respectively with the spools 14a and 15a. A swing motor 34 is connected to the actuator ports 24b and 25b which are associated with the spool 15b. A boom cylinder 35, an arm cylinder 36 and a bucket cylinder 37 are connected respectively to the actuator ports 22b and 23b; 22c and 23c; and 24c and 25c which are associated respectively with the spools 14b, 14c and 15c. The left and right-hand traveling motors 32 and 33, the swing motor 34, the boom cylinder 35, the arm cylinder 36 and the bucket cylinder 37 are driven whereby left- and right-hand travel devices, a swing, a boom, an arm and a bucket, which are hydraulic driven elements for the hydraulic excavator, are driven.

In the hydraulic drive system constructed as described above, if the directional control valves formed respectively by the spools 14a and 15a are operated by the same amount in an attempt, for example, at linear traveling of the hydraulic excavator, the hydraulic fluid delivered from the hydraulic pump 30 passes through the spools 14a and 15a via the pump port 19, the pump line 18 and the branch lines 20a and 21a, and is supplied to the left and right-hand traveling motors 32 and 33, whereby the left and right-hand motors 32 and 33 are driven so that the hydraulic drive system travels. At this time, since, as described above, the pressure losses of the flow from the pump port 19 to the spools 14a and 15a are the same as each other, the differential pressures across the respective spools 14a and 15a become substantially the same as each other, so that the hydraulic fluid is supplied by equal amount to the left and right-hand traveling motors 32 and 33. Thus, the left- and right-hand traveling motors 32 and 33 are driven at the same or equal speed, so that it is possible to linearly drive the hydraulic drive system.

In connection with the above, this is the same if the left and right-hand traveling motors 32 and 33 are connected to any actuator ports. For instance, even if the left-traveling motor 32 is connected to the illustrated actuator ports 22a and 23a, and if the right-hand traveling motor 33 is connected to the actuator ports 24c and 25c which are associated with the spool 15c remotest from the spool 14a, the pressure losses of the hydraulic fluid flow from the pump port 19 to the respective spools 14a and 15c are substantially the same as each other as described above, so that the linear traveling is likewise made possible. Accordingly, according to the embodiment, since no design constraints exist in positions the ports to be connected to the actuators, there is also provided an advantage of a high degree of freedom of the design.

Further, according to the embodiment, the three sets of spool bores 12a~13c are arranged in juxtaposed relation to each other, and the actuator ports 22a~25c are arranged respectively at the sides of the pairs of spools 14a~15c inserted respectively in the pairs of spool bores opposite to the side thereof where the pairs of spools face toward each other. By doing so, the wall thicknesses of the casing 11 required for strength on the side of the actuator ports are the same as those of the conventional apparatus, but, with reference to the wall thickness of the casing 11 required for strength on the side of the spools opposite to the actuator ports, it can be automatically secured for one of the pair of spools in each set if the wall thickness for the other spool Is secured. Specifically, the wall thickness portion of the casing 11 between each pair of spools serves as a strength element common to both the spools. For this reason, the weight of the casing 11 can considerably be reduced as compared with, for example, the conventional six-series valve apparatus. Further, it is possible to keep the entire valve apparatus compact.

Another embodiment of the invention will be described with reference to FIGS. 4 and 5. In these figures, components and parts like or similar to those illustrated in FIGS. 1 through 3 are designated by the same reference numerals. The embodiment is arranged such that means for extracting a load pressure is provided, and consideration is made for application to a load sensing system.

Figure 4:
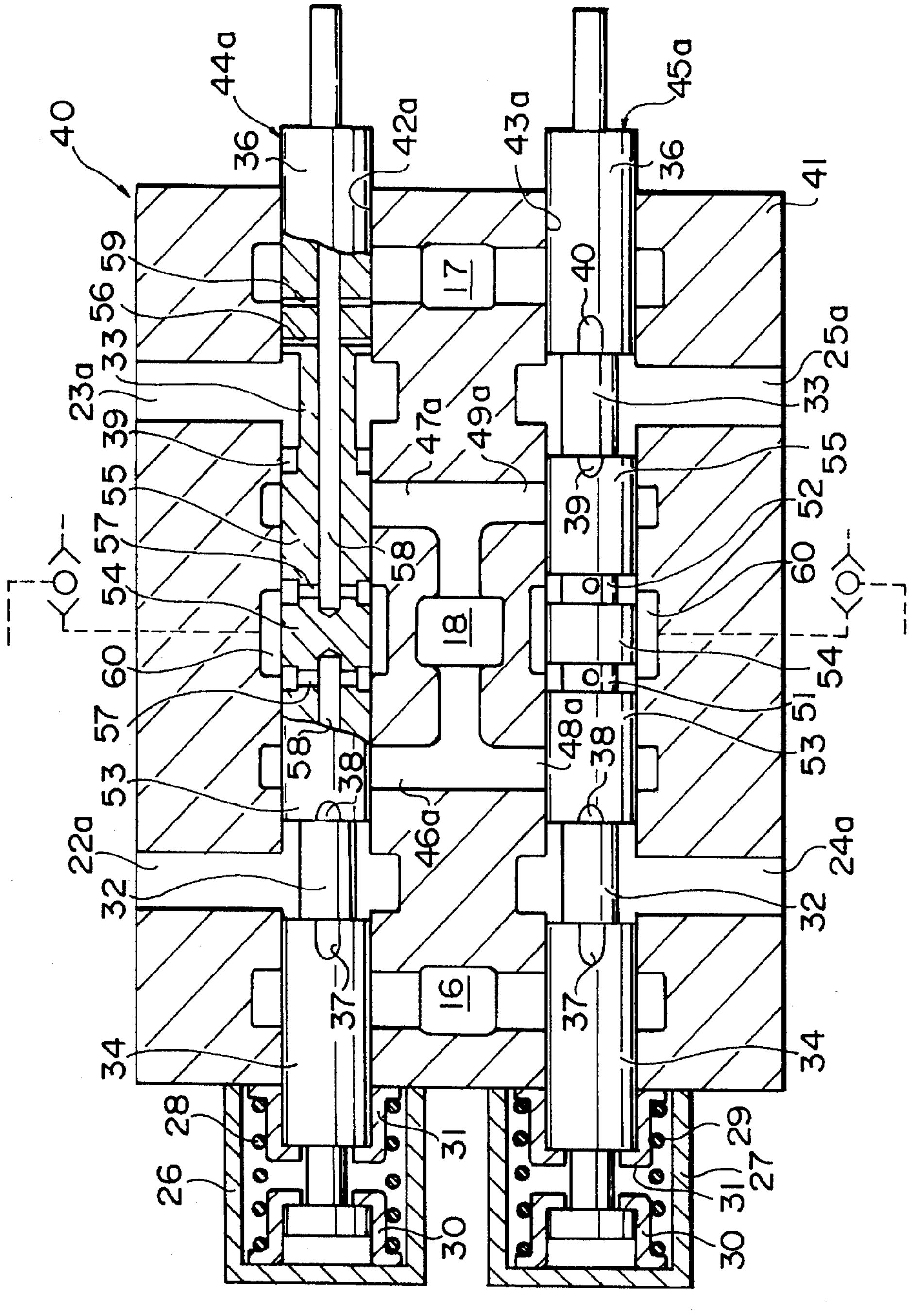
FIG. 4 is a cross-sectional view similar to FIG. 1, but showing a valve apparatus according to another embodiment of the invention.

In FIG. 4, similarly to the embodiment described previously, a casing 41 of a valve apparatus 40 is formed therein with three sets of spool bores 42*a* and 43*a* (only one set shown) each having a pair of spool bores arranged in juxtaposed relation to each other. Spools 44*a* and 45*a* each forming a directional control valve are slidably inserted respectively in the spool bores 42*a* and 43*a*. Further, the pump line 18 is arranged to communicate with each of the spool bores 42*a* and 43*a* through two pairs of branch lines 46*a* and 47*a*; and 48*a* and 49*a*.

On the other hand, of three lands of each of the spools 44*a* and 45*a*, which are divided by the pair of smaller-diameter sections 32 and 33, the central land is further divided into three lands 53, 54 and 55 by a pair of smaller-diameter sections 51 and 52. The branch lines 46*a* and 47*a*; or 48*a* and 49*a* of the pump line described above communicate respectively with bore sections at which both the lands 53 and 55 are located.

Each of the spools 44*a* and 45*a* Is formed therein with respective pairs of radial passages 56 and 57 and a pair of axial passages 58 corresponding to the actuator ports 22*a* and 23*a*; or 24*a* and 25*a*, which respectively form load lines for extracting pressures within the actuator ports 22*a* and 23*a*; or 24*a* and 25*a*, that is, load pressures within the actuators connected to these ports upon operation of the spools. Each of the spools 44*a* and 45*a* is further formed therein with a pair of radial passages 59 for causing the pressures of the respective load lines to be released to a tank through the respective tank lines 16 and 17 at the neutral position of the spools. Of the radial passages for the load lines, the passages 57 near the center of the spool 44*a* or 45*a* open respectively to the smaller-diameter sections 51 and 52, and the casing 41 is formed therein with a pair of grooves 60 each of which is capable of communicating with the radial passages 57 through the smaller-diameter sections 51 and 52.

In the valve apparatus 40 constructed as above, when, for example, the spool 44*a* is moved to the left in the figure, the branch line 47*a* and the actuator port 23*a* communicate with each other through the notches 39. Flow rate in proportion to the operational amount of the spool 44*a* flows from the pump line 18 to the actuator port 23*a*, so that the actuator connected to the actuator port 23*a* is driven. Simultaneously, the load pressure of the actuator is generated at the actuator port 23*a*, so that the load pressure is transmitted to the groove 60 through the passages 56, 58 and 57 of the load lines. The load pressure transmitted to the groove 60 is further introduced to the outside through a plurality of shuttle valves which are incorporated in the valve apparatus 40. The shuttle valves are schematically shown in FIG. 4 by the double dotted lines. When the spool 44*a* is moved to the right in the figure, the load pressure in the actuator port 22*a* is likewise introduced to the groove 60. Moreover, when the plurality of spools are operated so that the load pressures of the plurality of the actuators are extracted, the maximum pressure of these load pressures is selected by the plurality of shuttle valves, and is delivered to the outside.

Figure 5:
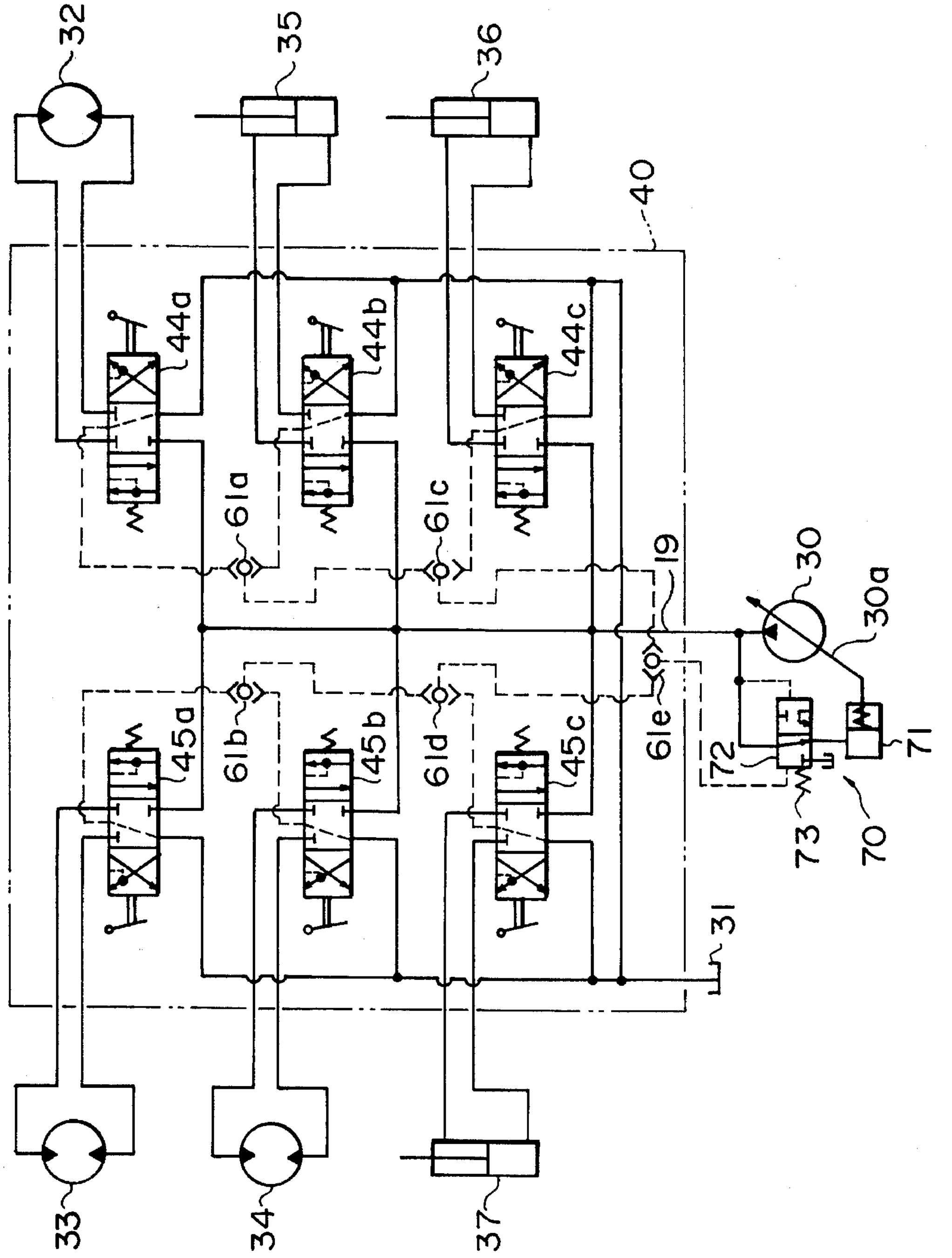
FIG. 5 is a circuit view showing an example of a hydraulic drive system which is formed by the use of the valve apparatus illustrated in FIG. 4.

An example is shown in FIG. 5, in which the valve apparatus 40 according to the embodiment is used to form a hydraulic drive system of load sensing type. This is also an example of the hydraulic drive system for the hydraulic excavator. Similarly to FIG. 3, the left and right-hand traveling motors 32 and 33, the swing motor 34, the boom cylinder 35, the arm cylinder 36 and the bucket cylinder 37 are connected to the valve apparatus 40. Further, the other two sets of spools 44*b* and 45*b*; and 44*c* and 45*c*, which are not shown in FIG. 4, are illustrated in FIG. 5, and the above-described shuttle valves are designated by the reference numerals 61*a*~61*e*.

The delivery rate of the hydraulic pump 30 is controlled by a pump regulator 70 of load sensing type. The pump regulator 70 comprises a work cylinder 71 connected to a swash plate 30*a* of the hydraulic pump 30 for driving the swash plate 30*a*. Hydraulic fluid is supplied to a chamber within the work cylinder 71 on the side of a bottom thereof through a control valve 72 for driving the work cylinder 71. Delivery pressure of the hydraulic pump 30 is introduced into one of a pair of opposed drive sections of the control valve 72, and the load pressure extracted by the above-described load lines and the shuttle valves 61*a*~61*e* is introduced into the other drive section. Moreover, a spring 73 is arranged at the drive section located on the side where the load pressure is introduced, for setting a load sensing differential pressure.

When the load pressure introduced into the control valve 72 is raised, the latter is driven to the right in the figure, so that the hydraulic fluid is supplied to the chamber within the work cylinder 72 on the side of the bottom thereof to increase the tilting angle of the swash plate 30*a*. Conversely, when the load pressures decrease, the control valve 72 is driven to the left in the figure, so that the hydraulic fluid on the side of the bottom of the work cylinder 71 is discharged to the tank to reduce the tilting angle of the swash plate 30*a*. In this manner, the pump delivery amount is controlled, and the differential pressure between the pump delivery pressure and the load pressure is retained at a value set by the spring 73.

Also in the embodiment constructed as above, since the fundamental or basic construction is the same as that of the embodiment illustrated in FIGS. 1 through 3, similar advantages can be obtained. Particularly, also in the case where the hydraulic drive system of load sensing type shown in FIG. 5 is constructed by the valve apparatus 40 according to the embodiment, the pressure losses of the hydraulic fluid flow from the pump port 19 to the respective spools 14*a*~15*c* are substantially the same as each other for all of the spools. Accordingly, if the spools 44*a* and 45*a* are operated by the same amount, the flow rates of the hydraulic fluid supplied to the left and right-hand traveling motors 32 and 33 become substantially the same as each other, so that it is possible to secure the linearity of the traveling. Further, since the left and right-hand traveling motors 32 and 33 may be connected to any actuator ports, the degree of freedom of the design is enhanced.

Moreover, the following further advantages can be obtained according to the embodiment.

The differential pressure between the pump delivery pressure and the load pressure is retained at the prescribed value of the spring 73 in the load sensing system as described above. Accordingly, if, the more the spools are positioned downstream and the pressure losses increase like the conventional valve apparatus in which the pump line passes through the spools, the differential pressures across the spools on the downstream side in which the pressure losses are large become small, so that, even if the spools are operated to their respective maximum openings, no corresponding sufficient passing flow rate can be obtained. Thus, it is made Impossible to drive the actuators at the maximum speed. To the contrary, in the embodiment, since the pressure losses of the flow from the pump port 19 to the respective spools 44*a*~45*e* are extremely small, the differential pressures across the spools are brought to a sufficient value which substantially corresponds to the prescribed value of the spring 73. If the spools are operated to the maximum openings, the actuators can be driven at the maximum speed so that the operability is improved.

Furthermore, when the plurality of actuators are driven simultaneously, a difference occurs in the differential pressure across each spool In accordance with a difference in the pressure loss in the conventional valve apparatus. Accordingly, in the case where the same spool is used, the characteristic of the passing flow rate with respect to the operational amount of the spool differs spool by spool. Thus, a problem occurs in the operability of the simultaneous operation of the plurality of actuators. According to the embodiment, the pressure losses of the hydraulic fluid flow from the pump port 19 to the respective spools 14*a* ~15*c* are substantially the same as each other for all of the spools. Thus, if the load pressure is the same, the differential pressures across the respective spools become substantially the same as each other, so that the characteristics of the passing flow rates with respect to the operational amounts of the spools also become the same as each other. For this reason, the operability of the simultaneous driving of the plurality of actuators is improved and, since the same spools can be used, there is obtained such an advantage as to reduce the cost.

In the above-described embodiments, the pump line is so formed as to extend in the direction perpendicular to the plane in which the axes of the spool bores in each set arranged in juxtaposed relation are located. However, the pump line may be formed to intersect the plane at an angle other than 90°. For instance, the spool bores may be arranged in a zigzag manner with the pump line located therebetween. In this case, the pump line intersects the above-mentioned plane at an angle in compliance with the Intervals of the zigzag arrangement of the spool bores.

Further, the branch lines from the pump line to the respective spool bores are substantially the same in length as each other. However, the lengths of the branch lines may be altered or modified within a range of the intended purpose of the invention. Moreover, the arrangement may be such that no branch lines are provided, but the pump line is In direct contact with the spool bores.

Furthermore, the operation of the spools is made by the manual operation due to the operational handles. It is needless to say, however, that the operation of the spools may be other optional operational systems such as pilot operation, solenoid operation and so on. Moreover, in the case where the valve apparatus according to the invention is used in the load sensing system, a plurality of pressure compensating valves may be incorporated in the valve apparatus.

According to the invention, since the pump line is connected to each spool without passing through the other spools, the pressure loss between the pump port and each spool is reduced and the energy loss is reduced, and further the heat generation becomes also small so that the reliability of the valve apparatus is improved and the service life of the instruments is prolonged.

Further, In the case where the valve apparatus is used in control of the traveling device, the linearity of the traveling is improved.

Furthermore, in the case where the valve apparatus is used in the hydraulic drive system of load sensing type, the actuators can be driven at sufficient speed, and the operability of the simultaneous driving of the plurality of actuators is improved.

What is claimed is:

1. A hydraulic drive system comprising a hydraulic pump, a plurality of hydraulic actuators driven by hydraulic fluid delivered from said hydraulic pump, a plurality of directional control valves of closed center type for respectively controlling flows of the hydraulic fluid supplied to said plurality of actuators from said hydraulic pump, and pressure compensating means for retaining a differential pressure between a delivery pressure of said hydraulic pump and a maximum load pressure of said actuators, to a prescribed value, wherein said hydraulic drive system includes a valve apparatus which comprises a casing formed therein with at least one pair of spool bores arranged in juxtaposed relation to each other, the pair of spool bores having axes in a plane, a single common pump port connected to said hydraulic pump, at least one tank port including a pair of actuator ports connected to each of said plurality of actuators and communicating with each of said spool bores, and at least one corresponding pair of spools arranged in juxtaposed relation to each other and slidably inserted respectively in said spool bores in said casing, each of said spools controlling communication between said common pump port and tank port and the corresponding pair of said actuator ports, said common pump port communicating with a common pump line formed in the casing between the pair of spool bores and spools arranged in juxtaposed relation so as to perpendicularly intersect the plane in which the axes of the pair of spool bores extend, whereby said valve apparatus provides said plurality of directional control valves of closed center type.

2. A valve apparatus comprising a casing having formed therein a plurality of spool bores, a single common pump port, at least one tank port and a plurality of actuator ports including a pair of actuator ports communicating with each of said spool bores, and a plurality of corresponding spools slidably inserted respectively in said spool bores and said casing, each of said spools controlling communication between said common pump port and tank port and the corresponding pair of said actuator ports to provide a directional control valve of closed center type, wherein said plurality of spool bores includes a plurality of pairs of spool bores arranged in juxtaposed relation to each other and having respective pairs of axes each extending in a respective plane, said planes being arranged in juxtaposed relation with corresponding pairs of the spools received within the pairs of spool bores, and said common pump port is arranged to communicate with a common pump line formed between a first and second spool bore of each of said pairs of spool bores so that the common pump line intersects the planes in which the respective axes of the pairs of spool bores extend; and wherein said pump line is formed in the casing to perpendicularly intersect the planes in which the respective axes of the pairs of spool bores extend.

3. The valve apparatus according to claim 2, further comprising branch lines extending between said common pump line and each of said first and second spool bores of said pairs of spool bores, and each of said branch lines having a substantially equal length as measured between said common pump line and a respective said spool bore for equalizing differential pressure across each of the pairs of spool bores.

4. The valve apparatus according to claim 2, wherein the pair of actuator ports communicating with each of said spool bores are positioned at a side of the corresponding pair of spools opposite to the side thereof where the pair of spools face toward each other.

5. The valve apparatus according to claim 2, wherein said common pump line communicates with said pair of spool bores arranged in juxtaposed relation through respective branch lines.

6. The valve apparatus according to claim 2, wherein said pair of spools arranged in juxtaposed relation provide directional control valves for controlling a pair of traveling motors of a construction vehicle.

* * * * *